United States Patent
Nass et al.

(10) Patent No.: US 6,207,736 B1
(45) Date of Patent: *Mar. 27, 2001

(54) SYNERGISTIC FLAMEPROOFING COMBINATION FOR POLYMERS

(75) Inventors: Bernd Nass, Augsburg; Wolfgang Wanzke, Meitingen, both of (DE)

(73) Assignee: Clariant GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,051

(22) Filed: Aug. 4, 1998

(30) Foreign Application Priority Data

Aug. 8, 1997 (DE) .............................. 197 34 437

(51) Int. Cl.⁷ ..................................... C08K 5/53
(52) U.S. Cl. ..................... 524/126; 524/133; 524/416; 524/417
(58) Field of Search .................. 524/133, 126, 524/416, 417

(56) References Cited

U.S. PATENT DOCUMENTS

| | | | |
|---|---|---|---|
| 3,397,035 | * 8/1968 | Shen et al. | 524/415 |
| 3,594,347 | * 7/1971 | Lazarus et al. | 260/45.75 |
| 3,900,444 | 8/1975 | Racky et al. . | |
| 4,036,811 | 7/1977 | Noetzel et al. . | |
| 4,049,612 | * 9/1977 | Sandler | 524/133 |
| 4,078,016 | * 3/1978 | Kramer | 524/133 |
| 4,208,322 | * 6/1980 | Sandler . | |
| 4,632,946 | 12/1986 | Muench et al. | 523/179 |
| 5,102,931 | 4/1992 | Fuhr et al. | 524/126 |
| 5,164,437 | * 11/1992 | Chakrabarti et al. | 524/400 |
| 5,173,515 | 12/1992 | Von Bonin et al. | 521/103 |
| 5,281,637 | 1/1994 | Blocker | 524/100 |
| 5,326,805 | 7/1994 | Sicken et al. . | |
| 5,773,556 | * 6/1998 | Kleiner et al. | 524/133 |
| 5,780,534 | 7/1998 | Kleiner et al. . | |

FOREIGN PATENT DOCUMENTS

| | | |
|---|---|---|
| 19708726 | 9/1998 | (DE) . |
| 0006568 | 1/1980 | (EP) . |
| 327496 | * 9/1989 | (EP) . |
| 0699708 | 3/1996 | (EP) . |
| 2422698 | 11/1978 | (FR) . |
| 2021598 | 12/1979 | (GB) . |
| WO 97/39053 | 10/1997 | (WO) . |
| WO 98/03515 | 1/1998 | (WO) . |
| WO 98/39381 | 9/1998 | (WO) . |

OTHER PUBLICATIONS

Abstract of WO 98/39381 dated Sep. 11, 1998.
Patent Abstract of Japan—Publication No. 05339417.
Patent Abstract of Japan—Publication No. 05086254.

* cited by examiner

*Primary Examiner*—Veronica P. Hoke
(74) *Attorney, Agent, or Firm*—Susan S. Jackson; Scott E. Hanf

(57) ABSTRACT

The present invention relates to a synergistic flameproofing combination for polymers, in particular for ABS, which contains, as component A, a phosphinic acid salt of the formulae (I) defined in the description and/or a diphosphinic acid salt of the formula (II) and/or polymers thereof and which contains, as component B, a nitrogen-containing phosphate or a mixture of the compounds defined by the formulae.

11 Claims, No Drawings

SYNERGISTIC FLAMEPROOFING COMBINATION FOR POLYMERS

The invention relates to a synergistic flameproofing combination which contains calcium, aluminum or zinc phosphinates and nitrogen-containing phosphates.

BACKGROUND OF THE INVENTION

Polymers are frequently rendered flame-retardant by adding to them phosphorus-containing or halogen-containing compounds or mixtures thereof. Mixtures of phosphorus- and nitrogen-containing compounds are also often used as flame retardants.

Alkali metal salts of phosphinic acid have already been proposed as flame-retardant additives for polyesters (DE-A-2 252 258). They must be introduced in amounts of up to 30% by weight and some of them have a disadvantageous, corrosion-promoting effect on the processing machines.

Furthermore, the salts of phosphinic acids with an alkali metal or with a metal from the second or third main group of subgroup of the Periodic Table have been used for the preparation of flame-retardant polyamide molding materials, in particular the zinc salts (DE-A-2 447 727).

Calcium and aluminium phosphinates have proven particularly effective in polyesters (EP-A-699 708). However, the preparation of these phosphinates on an industrial scale is relatively complicated and expensive, which very greatly limits the potential uses of the products as flame retardants for plastics.

The application PCT/EP97/01664 describes synergistic combinations of different phosphinates with heat-stable organic nitrogen compounds which are not very volatile and have a particularly good and also economical flameproofing effect in polymers.

Aluminum hydroxide or phosphate, too, can be used in mixtures with said phosphinic acid salts as a flame-retardant additive (German Patent Application No. 19708726.4), even if the synergistic action is not so pronounced as in the case of the organic nitrogen compounds.

It was found, surprisingly, that nitrogen-containing, purely inorganic phosphates mixed with the phosphinates have an action which is similarly good but in some cases even better. In addition, compared with commercial flame-retardant molding materials, molding materials treated according to the invention have high light stability if light stabilizers of the type comprising sterically hindered amines and/or UV absorbers are used together with the flameproofing mixtures.

SUMMARY OF THE INVENTION

The invention thus relates to a synergistic flameproofing combination for polymers which contains, as component A, a phosphinic acid salt of the formula (I) and/or a diphosphinic acid salt of the formula (II) and/or polymers thereof

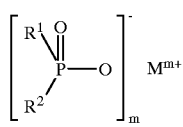

(I)

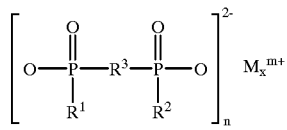

(II)

in which $R^1$ and $R^2$ are linear or branched $C_1$–$C_6$-alkyl, preferably $C_1$–$C_4$-alkyl, e.g. methyl, ethyl, n-propyl, isopropyl, n-butyl, tert-butyl or n-pentyl, or phenyl;

$R^3$ is linear or branched $C_1$–$C_{10}$-alkylene, preferably $C_1$–$C_6$-alkylene, e.g. methylene, ethylene, n-propylene, isopropylene, n-butylene, tert-butylene, n-pentylene, n-octylene or n-dodecylene;

$C_6$–$C_{10}$-arylene, e.g. phenylene or naphthylene, preferably phenylene;

alkylarylene, e.g. methylphenylene, ethylphenylene, tert-butylphenylene, methylnaphthylene, ethylnaphthylene or tert-butylnaphthylene;

arylalkylene, e.g. phenylmethylene, phenylethylene, phenylpropylene or phenylbutylene;

M is a calcium, aluminum or zinc ion, preferably an aluminum ion;

m is 2 or 3;

n is 1 or 3;

x is 1 or 2, and which contains, as component B, a nitrogen-containing phosphate of the formulae $(NH_4)_yH_{3-y}PO_4$ or $(NH_4PO_3)_z$, in which y may assume numerical values from 1 to 3 and z is any desired number, typically also the average value of a chain length distribution.

DESCRIPTION OF THE PREFERRED EMBODIMENTS

Below, the term "phosphinic acid salt" denotes salts of phosphinic and diphosphinic acids and polymers thereof.

The phosphinic acid salts, which are prepared in aqueous medium, are essentially monomeric compounds. Depending on the reaction conditions, polymeric phosphinic acid salts can also form under certain circumstances.

Suitable phosphinic acids as a component of the phosphinic acid salts are, for example: dimethylphosphinic acid, ethylmethylphosphinic acid, diethylphosphinic acid, methyl-n-propylenephosphinic acid, methanedi (methylphosphinic acid), benzene-1,4-(dimethylphosphinic acid), methylphenylphosphinic acid and diphenylphosphinic acid.

The salts of the phosphinic acids according to the invention can be prepared by known methods which are described in more detail in EP-A-699 708. The phosphinic acids are reacted in aqueous solution with metal carbonates, metal hydroxides or metal oxides.

Polymers in the context of the invention are also described on pages 6 to 9 of the Application PCT/EP97/01664, which is hereby expressly incorporated by reference.

The amount of the phosphinic acid salt of the general formula I which is to be added to the polymers, or of the diphosphinic acid salt of the formula II, may vary within wide limits. In general, from 1 to 30% by weight, based on the prepared polymer compound, are used. The optimum amount depends on the nature of the polymer, on the type of component B and on the type of the phosphinic acid salt itself which is used and can be readily determined by experiments. From 3 to 20, in particular from 5 to 15, % by weight are preferred.

The phosphinic acid salts according to the invention can be used in different physical forms, depending on the polymer used and on the desired properties. Thus, the phosphinic acid salts may be milled to give a finely divided form, for example for achieving better dispersion in the polymer. If desired, mixtures of different phosphinic acid salts may also be used.

The phosphinic acid salts according to the invention are thermally stable and neither decompose the polymers during processing nor influence the preparation process of the plastics molding material. The phosphinic acid salts are nonvolatile under preparation and processing conditions for polymers.

The polymer molding material contains, as component B, a nitrogen-containing phosphate of the formulae $(NH_4)_yH_{3-y}PO_4$ (monophosphates) or $(NH_4PO_3)_z$ (polyphosphates), in which y may assume numerical values from 1 to 3 and z is any desired number, typically also the average value of a chain length distribution. There may be a smooth transition between the monophosphates and the polyphosphates, for example with diphosphates, triphosphates, etc. $(NH_4PO_3)_z$ typically denotes commercial ammonium polyphosphates having different chain lengths, which can be prepared by various processes. Both short-chain and long-chain polyphosphates may be used, so that z may assume, for example, values from 5 to 10,000. Poorly water-soluble, relatively long-chain ammonium polyphosphates having chain lengths>100 are preferred.

The amount of the phosphates (component B) to be added to the polymers may vary within wide limits. In general, from 1 to 30% by weight, based on the prepared polymer compound, are used. The optimum amount depends on the nature of the polymer, on the type of phosphinate (component A) used and on the type of the phosphate itself and can be readily determined by experiments. From 3 to 20, in particular from 5 to 15, % by weight are preferred.

Preferred thermoplastic polymers are industrial plastics, such as, for example, HI polystyrene (having a high impact strength), polyphenylene ethers, polyamides, polyesters, polycarbonates and blends or polyblends, such as ABS or PC/ABS.

ABS polymers are particularly preferred.

The flame-retardant components A and B can be incorporated into plastics molding materials by, for example, premixing all components as powder and/or granules in a mixer and then homogenizing them in the polymer melt in a compounding apparatus (e.g. a twin-screw extruder). The melt is usually extruded, cooled and granulated. The components A and B may also be introduced directly and separately into the compounding apparatus via a metering unit.

It is also possible to mix the flame-retardant additives A and B with prepared polymer granules or polymer powder and to process the mixture directly on an injection molding machine to give shaped articles.

In the case of polyesters, for example, the flame-retardant additives A and B may also be added to the polyester material during the polycondensation. In addition to the flame-retardant combination according to the invention and comprising A and B, fillers and reinforcing materials, such as glass fibers, glass beads or minerals, such as chalk, may also be added to the molding materials. In addition, the molding materials may also contain other additives, such as antioxidants, light stabilizers, lubricants, colorants, nucleating agents or antistatic agents. Examples of the additives which may be used are stated in EP-A-584 567.

The flame-retardant plastics materials are suitable for the production of moldings, films, filaments and fibers, for example by injection molding, extrusion or compression molding.

EXAMPLES

1. Components Used

| | |
|---|---|
| Commercial polymers (granules): | |
| ABS I | ®Novodur P2X (from Bayer AG, D) contains no fillers or reinforcing materials |
| ABS II | ®Novodur L3FR (from Bayer AG, D) contains bromine-containing flame-proofing composition |
| Polyamide 6 (PA 6) | ®Durethan B29 (from Bayer AG, D) contains no fillers or reinforcing materials |
| Polyamide 6 (PA 6-GV) | ®Durethan BKV30 (from Bayer AG, D) contains 25% of glass fibers |
| Polybutylene terephthalate (PBT-GV): | ®Celanex 2300 GV1/30 (from Hoechst Celanese, USA) contains 30% of glass fibers |
| Phosphinic acid salts (component A, pulverulent): | Aluminum salt of dimethylphosphinic acid, referred to below as DMPAL<br>Aluminum salt of methylethylphosphinic acid, referred to below as MEPAL<br>Aluminum salt of 1-methoxyethylmethylphosphinic acid, referred to below as methoxy-MEPAL<br>Aluminum salt of methylpropylphosphinic acid, referred to below as MPPAL |
| Ammonium polyphosphate (component B, pulverulent): | ®Hostaflam AP 422 (from Hoechst AG, D) |
| Antioxidants: | |
| AO 1: | ®Hostanox O 10 (from Hoechst AG, D), polynuclear phenol |
| AO 2: | Hostanox PAR 24 (from Hoechst AG, D), phosphite |
| Light stabilizers: | |
| LS 1: | ®Hostavin N 20 (from Hoechst AG, D), sterically hindered amine, monomeric |
| LS 2: | ®Hostavin ARO8 (from Hoechst AG, D), UV absorber, benzophenone type |

The flameproofing components (phosphinic acid salts, A) and optionally the synergistic agent (ammonium polyphosphate, B) were mixed, in the ratio stated in the Tables, with the polymer granules and possibly further additives and incorporated in a twin-screw extruder (type Leistritz LSM 30/34) at temperatures of 190–225° C. (ABS) or at temperatures of 230–260° C. (PA 6, PA 6-GV and PBT-GV). The homogenized polymer extrudate was taken off, cooled in a water bath and then granulated.

After sufficient drying, the molding materials were processed on an injection molding machine (type Toshiba IS 100 EN) at melt temperatures of 210–240° C. (ABS) or of 240–270° C. (PA 6, PA 6-GV and PBT-GV) to give test specimens, and testing for flame retardance and classification were carried out on the basis of the UL94 test (Underwriter Laboratories). The combustibility of the test specimens was rated by determining the oxygen index (LOI according to ASTM D 2863–77).

Table 1 shows the results of the comparative examples, in which phosphinic acid salts were used as the sole flame-proofing components in ABS, PA 6, PA 6-GV and PBT-GV.

The results of the Examples, in which phosphinic acid salts were tested in combination with the synergistic agents according to the invention, are listed in Table 2. All stated amounts are in % by weight and are based on the prepared polymer compound including flameproofing treatment.

The Examples reveal that a very good flameproofing effect is achieved with the combination, according to the invention, of phosphinic acid salts with synergistic agent B. In addition, the efficiency of conventional light stabilizers of the type comprising sterically hindered amines (HALS=

TABLE 1

Comparative Examples
Aluminum salts of phosphinic acids as the
sole flameproofing component in ABS, PA 6, PA 6-GV and PBT-GV

| Polymer | MEPAL [%] | DMPAL [%] | MPPAL [%] | Methoxy-MEPAL [%] | AO 1 [%] | AO 2 [%] | Class according to UL 94 (1.5 mm) | LOI [%] |
|---|---|---|---|---|---|---|---|---|
| ABS 1 | 30 | | | | | | not classifiable | 52.5 |
| ABS 1 | | 30 | | | | | V-2 | 51.0 |
| APS 1 | | | 30 | | | | V-1 | 38.0 |
| ABS 1 | | | | 30 | | | V-1 | 46.5 |
| PA 6 | 15 | | | | | | V-0 | 31.0 |
| PA 6-GV | 20 | | | | | | not classifiable | 40.0 |
| PBT-GV | 15 | | | | 0.15 | 0.20 | V-1 | 48.5 |
| PBT-GV | 20 | | | | 0.15 | 0.20 | V-0 | 49.5 |

TABLE 2

Examples
Aluminum salts of phosphinic acids in combination with synergistic agents
according to the invention in ABS, PA 6, PA 6-GV and PBT-GV

| Polymer | MEPAL [%] | DMPAL [%] | MPPAL [%] | Methoxy-MEPAL [%] | Hostaflam AP 422 [%] | AO 1 [%] | AO 2 [%] | Class according to UL 94 (1.5 mm) | LOI [%] |
|---|---|---|---|---|---|---|---|---|---|
| ABS 1 | 15 | | | | 15 | | | V-0 | 28.5 |
| ABS 1 | 12.5 | | | | 12.5 | | | V-0 | 26.5 |
| ABS 1 | 10 | | | | 10 | | | V-2 | 24.0 |
| ABS 1 | 7.5 | | | | 7.5 | | | V-2 | 23.5 |
| ABS 1 | | 15 | | | 15 | | | V-0 | 30.0 |
| ABS 1 | | | 15 | | 15 | | | V-0 | 27.0 |
| ABS 1 | | | | 15 | 15 | | | V-0 | 27.0 |
| PA 6 | 10 | | | | 5 | | | V-0 | n.d.* |
| PA 6-GV | 10 | | | | 5 | | | V-0 | n.d.* |
| PBT-GV | 10 | | | | 5 | 0.15 | 0.20 | V-0 | 28.0 |

*n.d. = not determined

Table 3 shows the result of the exposure of a synergistic flameproofing combination according to the invention in ABS to artificial light in comparison with commercial ABS with a bromine-containing flameproofing composition in a ®Suntest apparatus from Heraeus with a Suprax filter at a black body temperature of 55° C.±5° C. without overhead aeration. The evaluation criterion is the discoloration, measured as the yellowness index (YI). In addition, the test according to UL 94 was carried out and the LOI value determined.

hindered amine light stabilizer) in combination with UV absorbers is not impaired.

What is claimed is:

1. A synergistic non-halogenated flameproofing combination for non-halogenated polymers, containing, as component A, a phosphinic acid salt of the formula (I) and/or a diphosphinic acid salt of the formula (II) and/or polymers thereof

TABLE 3

| Polymer | MEPAL [%] | Hostaflam AP 422 [%] | LS 1 [%] | LS 2 [%] | Class acc. to UL 94 (1.6 mm) | LOI [%] | YI after 0 h | YI after 500 h | YI after 1100 h | YI after 1600 h |
|---|---|---|---|---|---|---|---|---|---|---|
| ABS 1 | | | 0.5 | 0.5 | not classifiable | 19 | 51 | 39 | 48 | 65 |
| ABS 1 | 12.5 | 12.5 | 0.5 | 0.5 | V-0 | 26 | 68 | 50 | 52 | 55 |
| ABS II | | | 0.5 | 0.5 | V-1 | 25.5 | 29 | 94 | 101 | 102 |

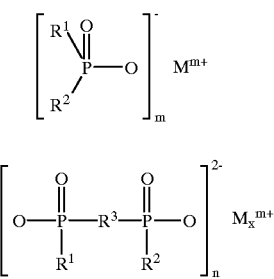

(I)

(II)

in which

R$^1$ and R$^2$ are linear or branched C$_1$–C$_6$-alkyl or phenyl;

R$^3$ is linear or branched C$_1$–C$_{10}$-alkylene, C$_6$–C$_{10}$-arylene or alkylarylene or arylalkylene;

M is a calcium, aluminum or zinc ion;

m is 2 or 3;

n is 1 or 3;

x is 1 or 2;

and, as component B, a nitrogen-containing phosphate of the formulae $(NH_4)_yH_{3-y}PO_4$ or $(NH_4PO_3)_z$, in which y is from 1 to 3 and z is any desired number.

2. A process for flameproofing a polymer to form a prepared non-halogenated polymer compound comprising adding to a non-halogenated polymer a synergistic non-halogenated flameproofing combination comprised of a component A and a component B, wherein the component A is a phosphinic acid salt of the formula (I), a diphosphinic acid salt of the formula (II), a polymer thereof, or a combination thereof

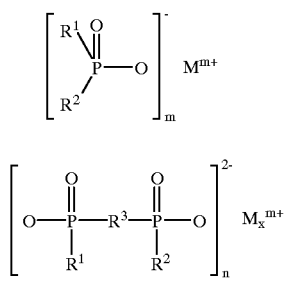

(I)

(II)

in which

R$^1$ and R$^2$ are linear or branched C$_1$–C$_6$-alkyl or phenyl;

R$^3$ is linear or branched C$_1$–C$_{10}$-alkylene, C$_6$–C$_{10}$-arylene or alkylarylene or arylalkylene;

M is a calcium, aluminum or zinc ion, m is 2 or 3;

n is 1 or 3;

x is 1 or 2; and the component B is a nitrogen-containing phosphate of the formulae $(NH_4)_yH_{3-y}PO_4$ or $(NH_4PO_3)_z$, in which y is from 1 to 3 and z is any number.

3. The flameproofing combination as claimed in claim 1, wherein

R$^1$ and R$^2$ are C$_1$–C$_4$-alkyl,

R$^3$ is C$_1$–C$_6$-alkylene or phenylene and

M is an aluminum ion.

4. The flameproofing combination as claimed in claim 1, wherein component B comprises ammonium polyphosphates having a chain length greater than 100.

5. The process as claimed in claim 2, wherein component A and component B, independently of one another, are each used in a concentration of from 1 to 30% by weight, based on the prepared polymer compound.

6. The process as claimed in claim 2, wherein component A and component B, independently of one another, are each used in a concentration of from 3 to 20% by weight, based on the prepared polymer compound.

7. The process as claimed in claim 2, wherein component A and component B, independently of one another, are each used in a concentration of from 5 to 15% by weight, based on the prepared polymer compound.

8. A flameproofed plastics molding material, comprising a flameproofing combination as claimed in claim 1.

9. The flameproofed plastics molding material as claimed in claim 8, wherein the plastic is ABS.

10. The process as claimed in claim 2, wherein the polymer is polystyrene, polyphenylene ether, polyamide, polyester, polycarbonate, a blend or a polyblend.

11. The process as claimed in claim 10, wherein the blend is ABS.

* * * * *